(12) United States Patent
Sakakibara (10) Patent No.: US 6,603,288 B2
(45) Date of Patent: Aug. 5, 2003

(54) BATTERY CHARGERS AND CHARGING METHODS

(75) Inventor: Kazuyuki Sakakibara, Aichi-ken (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/201,709

(22) Filed: Jul. 22, 2002

(65) Prior Publication Data

US 2002/0175659 A1 Nov. 28, 2002

Related U.S. Application Data

(63) Continuation of application No. 09/781,318, filed on Feb. 13, 2001, now Pat. No. 6,433,517, which is a continuation of application No. 09/531,596, filed on Mar. 20, 2000, now Pat. No. 6,204,641, which is a continuation of application No. 09/258,140, filed on Feb. 26, 1999, now Pat. No. 6,075,347.

(30) Foreign Application Priority Data

Feb. 28, 1998 (JP) .............................. 10-64736

(51) Int. Cl.[7] .................................. H02J 7/16

(52) U.S. Cl. ..................................... 320/151

(58) Field of Search ................ 320/156, 151, 320/153

(56) References Cited

U.S. PATENT DOCUMENTS

| | | | | |
|---|---|---|---|---|
| 5,497,068 A | * | 3/1996 | Shiojima | 320/150 |
| 5,652,500 A | * | 7/1997 | Kadouchi et al. | 320/150 |
| 5,739,673 A | * | 4/1998 | Le Van Suu | 320/150 |
| 5,886,527 A | * | 3/1999 | Ito | 320/150 |
| 5,912,547 A | * | 6/1999 | Grabon | 320/150 |

FOREIGN PATENT DOCUMENTS

EP 0621990 * 6/1996

* cited by examiner

Primary Examiner—Edward H. Tso
Assistant Examiner—Pia Tibbits
(74) Attorney, Agent, or Firm—Orrick, Herrington & Sutcliffe LLP (57) ABSTRACT

A battery charger and a charging method capable of charging a battery are described. The current temperature of the battery is detected (in step S12) and a battery temperature increase rate is calculated based upon the detected temperature (in step S14). An allowable current value is then retrieved based upon the detected temperature and the calculated battery temperature increase rate, which allowable current value permits charging of the battery while preventing excessive battery temperature increases (in step S16), and the battery is charged using the allowable current value (in step S20). Thus, it is possible to charge the battery within a short period of time while preventing the battery temperature from excessively rising.

22 Claims, 6 Drawing Sheets

|  |  | \|T\| | | | | |
|---|---|---|---|---|---|---|
|  |  | ~T1 | T1~T2 | T2~T3 | T3~T4 | T4~ |
| dT/dt | ~X1 | I11 | I12 <1><3> | I13 <4> | I14 <9> | I15 <10><12> |
|  | X1~X2 | I21 | I22 <2> | I23 <5><7> | I24 <8> | I25 <11><13> |
|  | X2~ | I31 | I32 | I33 <6> | I34 | I35 <14><15> |

Fig. 7

BATTERY CHARGERS AND CHARGING METHODS

CROSS-REFERENCE

This application is a continuation of U.S. Patent application No. 09/781,318, filed Feb. 13, 2001, now U.S. Pat. No. 6,433,517, which was a continuation of U.S. Patent application No. 09/531,596, filed Mar. 20, 2000, now U.S. Pat. No. 6,204,641, which was a continuation of U.S. Patent application No. 09/258,140, filed Feb. 26, 1999, now U.S. Pat. No. 6,075,347, which claimed priority to Japanese Patent Application No. 10-64736, filed Feb. 28, 1998, all of which are incorporated herein by reference.

BACKGROUND OF THE INVENTION

1. Field of the Invention

The present invention relates to battery chargers and methods for charging a battery. The present invention relates, in particular, to battery chargers and charging methods suitable for charging a battery, such as a nickel metal hydride battery, that generates a relatively large amount of heat during charging.

2. Description of the Related Art

Rechargeable batteries have been recently used, e.g., as a power source for power tools. Nickel metal hydride batteries have been widely used as power tool batteries. To charge the battery, a battery charger for rapidly charging the battery using a relatively high current has been used. That is, while one battery is being rapidly charged for about 20 minutes, the power tool can be continuously used by replacing the depleted battery with another battery that has been recharged.

The inventor of the present invention studied ways to improve the performance of a power tool by using, as a battery, a nickel metal hydride battery. Although nickel metal hydride batteries can provide higher storage capacity than a nickel-cadmium battery, a large amount of heat is typically generated during charging. If the battery temperature becomes excessively high due to the generated heat, the electrodes and separators of cells within the battery will deteriorate and battery life will be shortened. Due to this reason, nickel metal hydride batteries cannot be rapidly charged using a high current according to known charging techniques designed for a nickel-cadmium battery.

Furthermore, nickel metal hydride batteries are more sensitive to overcharging than a nickel-cadmium battery and overcharging reduces the battery life. For that reason, it is required to avoid overcharging the nickel metal hydride battery. However, if the equipment does not require battery replacement, the charging current and the discharging current may be integrated and the battery is charged based on die integrated value in order to avoid overcharging the battery. Thus, the battery can be fully charged. On the other hand, if the equipment such as the above-stated power tool, requires replacing one battery with another, it has been difficult to fully charge the battery without overcharging it using known charging techniques.

SUMMARY OF THE INVENTION

In one aspect of the present teachings, battery chargers and battery charging methods are taught that permit rapid and complete charging of the battery without overheating the battery. In one embodiment, a battery charger is taught that includes:

a memory storing a map of allowable current values that are selected based upon the current battery temperature and the current battery temperature increase rate, with which a battery can be charged in order to prevent the battery temperature from excessively rising;

a temperature detection device detecting the current temperature of the battery;

a temperature increase rate output device calculating the battery temperature increase rate based upon the battery temperature detected by the temperature detection device;

an allowable current retrieval device retrieving the allowable current value from the map based upon the battery temperature detected by the temperature detection device and the battery temperature increase rate calculated by the temperature increase rate output device; and a charging device charging the battery with the allowable current value retrieved by the allowable current retrieval device.

In another embodiment, a battery charger is taught that includes:

a memory storing a map of allowable current values that are selected based upon the current battery temperature and the current battery temperature increase rate, with which a battery can be charged in order to prevent the battery temperature from excessively rising, the map including relatively low allowable current values when the battery temperature is relatively high and the battery temperature increase rate is relatively large;

a temperature detection device detecting the current temperature of the battery;

a temperature increase rate output device calculating the battery temperature increase rate based upon the battery temperature detected by the temperature detection device;

an allowable current retrieval device retrieving the allowable current value from the map based upon the battery temperature detected by the temperature detection device and the battery temperature increase rate calculated by the temperature increase rate output device;

a charging device charging the battery with the allowable current value retrieved by the allowable current retrieval device;

a charging completion determination device determining that charging has been completed based upon whether or not the battery temperature detected by the temperature detection device and the battery temperature increase rate calculated by the temperature increase rate output device fall within a region indicating a final charging stage (i.e., a region in which the battery temperature increase rate is relatively large and a relatively low allowable current value has been selected) at a relatively high frequency; and a charging concluding device stopping the battery charging when the charging completion determination device has determined that charging is completed.

In another embodiment, a charging method is taught that includes:

detecting the current temperature of a battery;

calculating the battery temperature increase rate from the detected temperature;

selecting an allowable current value based upon the detected temperature and the calculated battery temperature increase rate, with which the battery can be charged while preventing the battery temperature from excessively rising; and charging the battery with the retrieved allowable current value.

In another embodiment, a charging method is taught that includes:

detecting the current temperature of a battery;

calculating the battery temperature increase rate from the detected temperature;

selecting an allowable current value based upon the detected temperature and the calculated battery temperature increase rate, with which the battery can be charged while preventing the battery temperature from excessively rising;

charging the battery with the retrieved allowable current value;

determining that charging has been completed when the battery temperature increase rate is relatively large and when a relatively low allowable current value has been selected at a relatively high frequency; and concluding charging based on the determination that charging is completed.

According to the battery chargers and charging methods described above, charging current is controlled using a map of allowable current values with which a battery can be charged in order to prevent the battery temperature from excessively rising. The allowable current value is retrieved based upon the battery temperature and the battery temperature increase rate. The battery is charged with the allowable current value thus obtained and a nickel metal hydride battery, the temperature of which tends to excessively rise during charging, can be charged within a relatively short period of time without causing deterioration due to excessive temperature increases. Just before charging is completed, the temperature increase rate of the nickel metal hydride battery tends to substantially increase. Therefore, the battery is charged with a relatively low current when the charging operation is nearly complete. Consequently, it is possible to suppress "overshoot" after the completion of charging.

In another aspect of the present teachings, the completion of charging is determined, in particular, based on whether or not the battery temperature increase rate is relatively large and whether or not a relatively low current has been selected from the map at a relatively high frequency. That is, whether the battery is completely charged is determined based on whether or not the battery temperature increase rate is large and whether or not the increase rate is large, even though the charging current has been decreased. Due to this, it is possible to fully charge the battery without fear of overcharging and without being influenced by the remaining battery capacity, the battery temperature or other battery conditions.

DESCRIPTION OF THE PREFERRED EMBODIMENT

A representative battery charger and charging method according to the present invention will be described with reference to the accompanying drawings.

Figure 1:
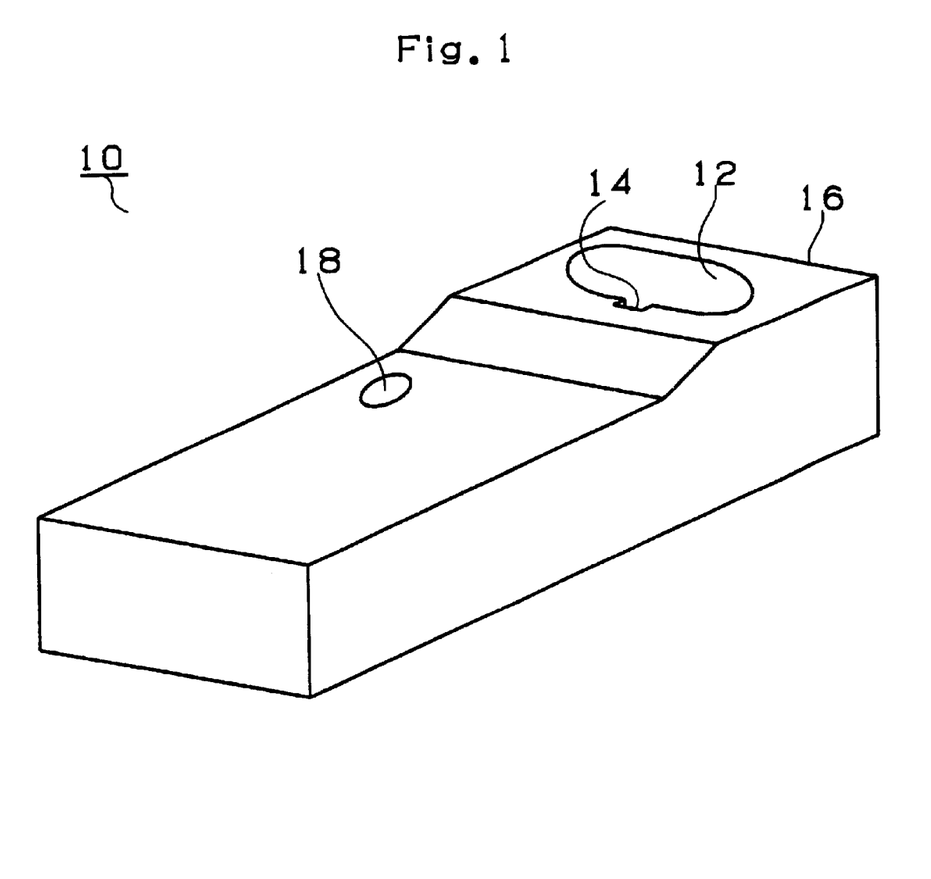
FIG. 1 is a perspective view of a battery charger of one embodiment according to the present invention.
Figure 2:
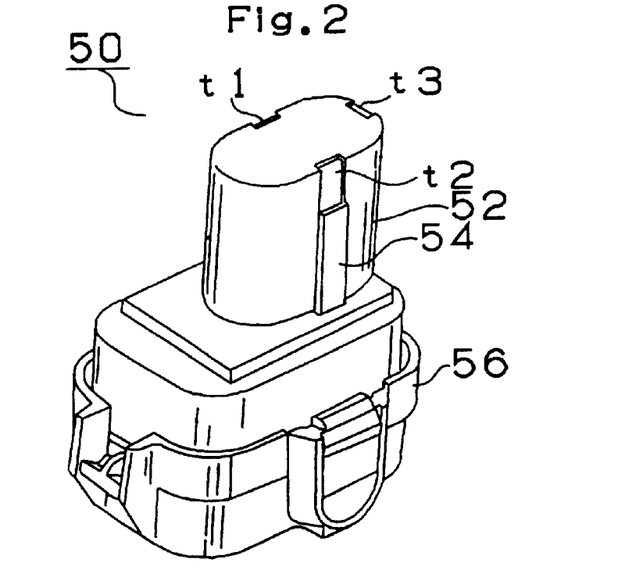
FIG. 2 is a perspective view of a battery pack of one embodiment according to the present invention.
Figure 3:
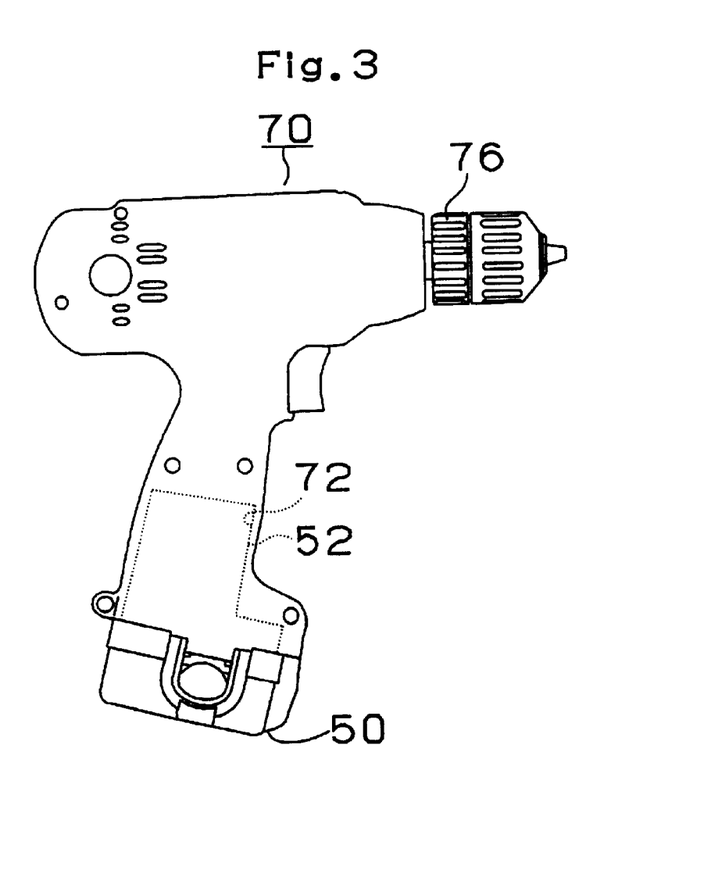
FIG. 3 is a perspective view of a battery-powered drill using the battery pack shown in FIG. 2.

FIG. 1 shows a battery charger 10 of one embodiment according to the present invention. FIG. 2 shows a battery pack 50 charged by the battery charger. FIG. 3 shows a battery-powered drill 70 driven by the battery pack 50.

As shown in FIG. 2, the battery pack 50, which includes a nickel metal hydride battery, consists or a generally cylindrical fitted section 52 and a generally prismatic base 56. A key-shaped key section 54 is formed on the side surface of the fitted section 52. The first input terminal t1 is connected to the cathode of the battery, the second input terminal t2 is connected to the anode therein and the third terminal t3 is connected to a temperature sensor consisting of a thermistor, and each are provided on the upper portion of the fined section 52.

As shown in FIG. 1, a fitting hole 12 for inserting the fitted section 52 of the battery pack 50 is formed in the battery charger 10 for charging the battery pack 50. A key way 14 for introducing the key section 54 of the fitted section 52 is formed on the sidewall of the fitting hole 12. The fitting hole 12 is integral with a housing 16, which defines the exterior of the battery charger 10 and is made from a resin. In this embodiment, the key section 54 is defined within the fitted section 52 of the battery pack 50 and the fitted hole 12 of the battery charger 10 includes the key way 14, which is defined therein. Thus, the battery pack 50 is prevented from being inserted into the battery charger 10 in an incorrect manner. First to third output terminals (not shown) are provided at the bottom of the fitting hole 12 so as to contact the first to third terminals t1, t2 and t3 of the battery pack 50. An LED lamp 18 is provided on the top of the battery charger 10 to indicate that the battery is being charged.

As shown in FIG 3, a fitting hole 72 for inserting the fitted section 52 of the battery pack 50 is defined within the battery-powered drill 70. When electric power is supplied from the first and second input terminals t1 and t2 of the battery pack 50 to the battery-powered drill 70, a motor (not shown) is driven to rotate a chuck 76. If the battery-powered drill 71) will be continuously used, a plurality of battery packs 50 may be sequentially used to allow continuous operation. To this end, the battery charger 10 in this embodiment is designed to be capable of rapidly charging the battery pack 50 in approximately 20 minutes.

Figure 4:
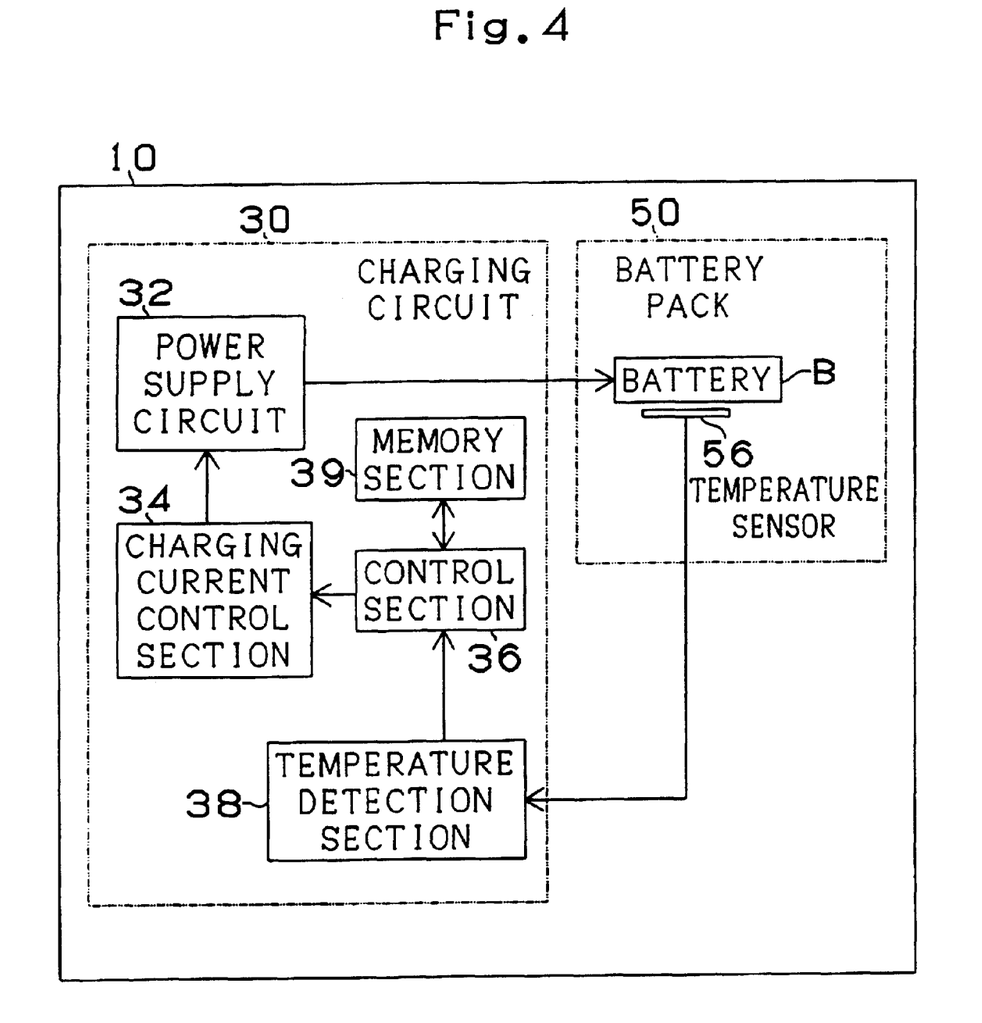
FIG. 4 is a block diagram showing a charging circuit for the battery charger shown in FIG. 1.

FIG. 4 shows the configuration of a control circuit 30 disposed within the battery charger 10. The control circuit 30 includes a temperature detection section 38 for detecting the temperature of the battery based upon an output value generated by a temperature sensor (or thermistor) 56 disposed within the battery pack 50. A memory section 39 stores a current controlling map. A control section 34 calculates a battery temperature increase rate by differentiating the temperature value outputted from the temperature detection section 38, and selects an allowable current value based on the battery temperature and the rate of battery temperature increase. The allowable current value is outputted as a current command value to the charging control section 34, and the charging current control section 34 controls a power supply circuit 32 based on the current command value generated by the control section 36 and adjusts the battery charging current.

Figure 5:
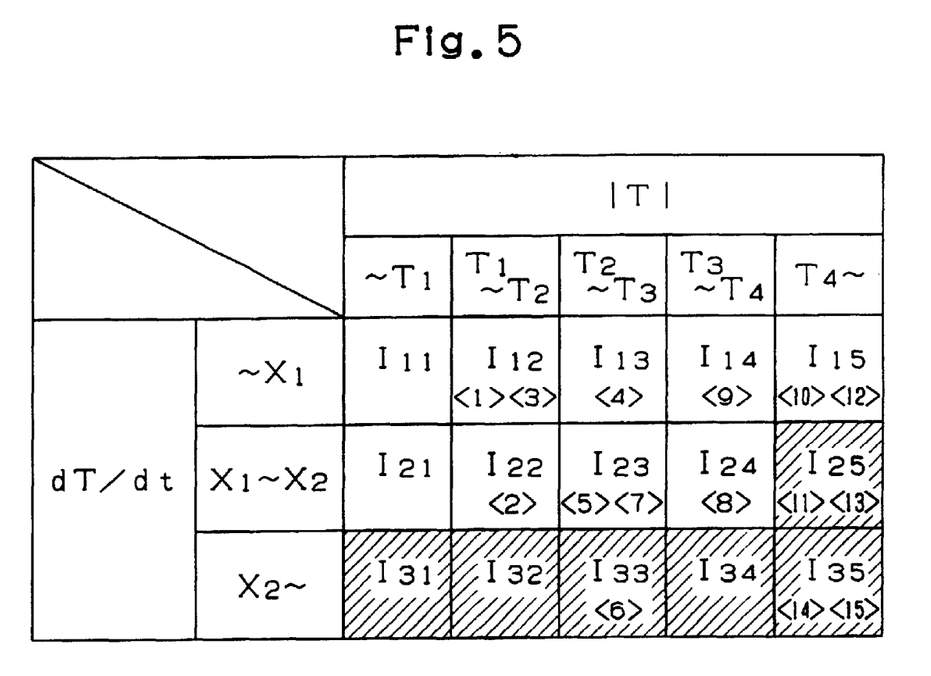
FIG. 5 is an explanatory view showing the contents of a map stored in the charging circuit.

Description to the constitution of the map used for current control will be given with reference to FIG. 5.

If the battery is charged with a relatively high current, the charging time is shortened, but the battery temperature increases rapidly. Conversely, if the battery is charged with a lower current, the charging time is lengthened, but the battery temperature increase is smaller. In particular, nickel metal hydride batteries are characterized by having a temperature gradient (or temperature increase) that greatly varies in accordance with charging current or the presently charged storage capacity. Considering these characteristics, in this embodiment, the battery is charged by frequently adjusting the charging current in order to rapidly charge the battery without overheating the battery. Specifically, battery chargers according to known techniques charge the battery using a constant current. However, the battery charger of this embodiment determines the state of the battery based on the present battery temperature and the present battery temperature increase rate, and the battery is charged using as high of a current as possible that can be supplied without overheating the battery, i.e., the battery is charged with varying currents in accordance with the state of the battery.

In this embodiment, if the battery temperature is relatively high, relatively low charging current is supplied to the battery. If the battery temperature is relatively low, relatively high charging current is supplied to the battery. If temperature increase rate is relatively large, relatively low charging current is supplied to the battery. If the temperature increase rate is relatively small, relatively high charging current is supplied to the battery.

As noted above, a map is provided for variable-control of the charging current and for specifying an optimum value of the charging current that can be supplied while still minimizing the battery temperature increase rate. In the map, the horizontal axis indicates the absolute temperature T of the battery and the vertical axis indicates the battery temperature increase rate dT/dt. That is, if the temperature of the battery is high and temperature increase rate is large (lower right side of the map), then a relatively low charging current is supplied to the battery. If the temperature of the battery is high and the temperature increase rate is small (upper right side of the map), a medium level charging current is supplied to the battery. If the battery temperature is low and the temperature increase rate is large (lower left side of the map), a medium level charging current is supplied to the battery. If the battery temperature is low and the temperature increase rate is low (upper left side of the map), a relatively high charging current is supplied to the battery. Namely, such optimum current values are stored in the map in order to meet both expected charging time (approximately 20 minutes) and expected final battery temperature.

If high current is discharged at low temperature (0° C. or less), battery performance deteriorates. It is, therefore, desirable to provide a low current value along the left column of the map in order to avoid performance deterioration.

The charging current supplied to the battery is selected based upon the present absolute battery temperature T and the present battery temperature increase rate dT/dt. It for example, the battery temperature is between T3 and T4 and the battery temperature increase rate dT/dt is between X1 and X2, then the current value stored in the region I24 is outputted.

Thereafter, the battery charger 10 of this embodiment detects that charging is completed based on the selection of charging currents from the different regions within the map. That is, according to known techniques, completion of charging is determined by maintaining the charging current at a constant value and observing the battery temperature or voltage. More specifically, known devices detect the battery temperature increase rate and the battery voltage, because the battery voltage decreases if charging current is supplied to the battery after the battery has become fully charged. In this manner, known devices determine that the battery is fully charged. However, in the battery charger of this embodiment, since charging current is adjusted as described above, it is impossible to detect whether the battery charging is completed based only on monitoring the battery temperature or temperature variations, or battery voltage or battery voltage variations. In this embodiment, therefore, the battery charger detects that charging is completed based on the selection of the charging current from certain ranges within the map.

While the battery is being charged, the charging current supplied to the battery will appear to move within the regions at random based on the temperature and temperature increase rate. In other words, before the battery is fully charged, the battery temperature significantly increases or the temperature increase rate is large. If a relatively small charging current region is then selected, that is, after a current from a region at the lower right side of the map is selected, then the charging current is decreased and the battery temperature increase rate is reduced. Such a current is selected from a region that corresponds to the upper portion of the map.

However, when the battery is close to a fully charged state, the battery temperature increase rate dT/dt becomes larger due to the characteristics of the nickel metal hydride battery. That is, when the battery temperature increase rate is larger a current from a lower region of the map is selected. In that case, even if the battery is charged with a relatively low current, the battery temperature increase rate typically still remains large. Using this principle, the battery charger of this embodiment repeatedly detects the battery temperature and determines the battery temperature increase rate (for example, three times) at predetermined intervals (e.g., at intervals of several thousand seconds). If the selected current falls within hatched regions I31, I32, I33, I34 and I35, in which the battery temperature increase rate is relatively large, or within region I25 in which battery temperature is high and the battery temperature increase rate is at a medium level, it is determined that battery charging has been completed and the charging process is then stopped.

A representative charging operation using the charging circuit 30 will be described in more detail with reference to the graph shown in FIG. 6.

Figure 6:
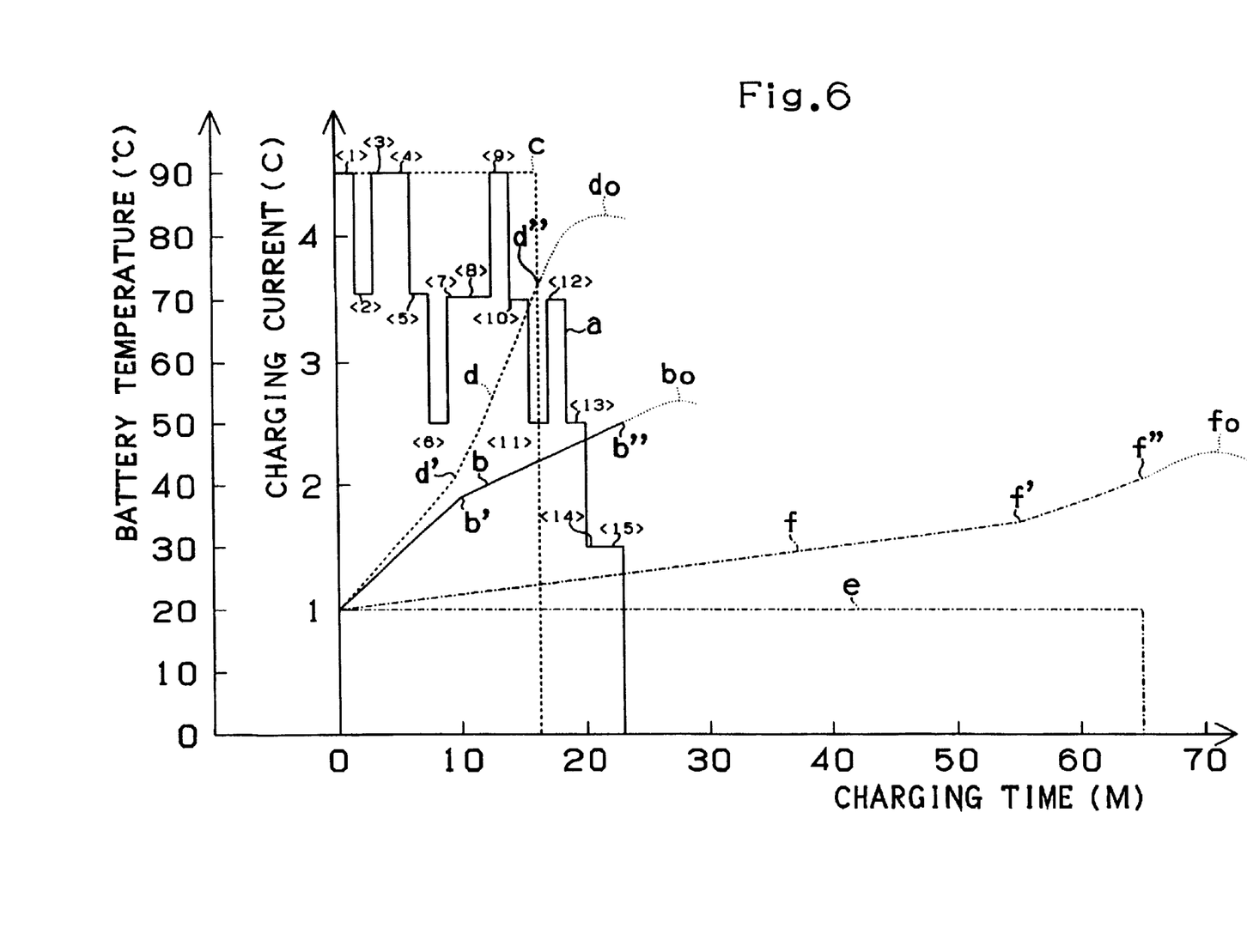
FIG. 6 is a graph showing the changes of charging current and battery temperature, which are both controlled by the charging circuit.

In FIG. 6, the horizontal axis indicates charging time, whereas the vertical axis indicates charging current and battery temperature. FIG. 6 also shows, for purpose of comparison, the temperature increase in a case where a nickel metal hydride battery was charged for one hour and the temperature increase in a case where the battery was rapidly charged as well as the temperature increase using the battery charger of this embodiment.

In the known art, in order to avoid generating heat while a nickel metal hydride is being charged, 1C charging is performed, as shown by dash line e of FIG. 6. That is, a 2AH nickel metal hydride battery is charged with 2A charging current for about one hour (65 minutes in FIG. 6). In the case of 1C charging, charging starts at a temperature of 200° C., as shown by dotted line f of FIG. 6, and ends at a temperature of 40° C. Due to the characteristics of the nickel metal hydride battery, a sharp temperature rise is seen just before the completion of charging (55 minutes after the start of charging), which is shown at point f' of FIG. 6, and further temperature rise is seen after point f" at which charging is completed (overshoot f0) The overshoot of the nickel metal hydride battery is believed to depend upon the gradient of temperature rise at the time charging is completed. If the gradient between points f'–f" is relatively small, overshoot-induced temperature rise is small. If the gradient is relatively large, that is, the battery temperature sharply increases at the end of charging, then overshoot-induced temperature rise is large.

In addition, dotted line c indicates the charging current when a battery is rapidly charged (4.5C charging) using a constant high current (9A) by a known battery charger so as to complete the charging operation within approximately 20 minutes. Dotted line d indicates the temperature change of the nickel metal hydride battery during rapid charging. As indicated by dotted line d, even if charging starts at a battery temperature of 20° C., the battery temperature reaches 70° C., at which the nickel metal hydride battery life is shortened, when charging is completed. Moreover, the battery temperature rapidly rises just before the completion of charging (11 minutes after start) indicated by point d' in FIG. 6 until point d" at which time charging is completed. Due to this rapid increase in battery temperature, the battery temperature significantly rises after point d", at which charging was completed (overshoot d0). The overshoot d0 causes the battery temperature to rise further (as high as 80° C.) even after charging has been completed. As a result, the life of the nickel metal hydride battery is shortened. According to the graph of FIG. 6, since charging starts at 20° C. and is completed at 80° C., the battery temperature rise is 60° C. during that period. It therefore, charging of the nickel metal hydride battery starts at 30° C., and temperature rises by 60° C. to 90° C. or higher, the battery performance will greatly deteriorate due to the excessive temperature of the battery.

Solid line <a> indicates the changes in charging current supplied by the battery charger 10 of the first embodiment according to the present invention. Solid line <b> indicates the changes in the temperature of the nickel metal hydride battery, if the battery is charged using the battery charger 10 of this embodiment. The battery charger 10 supplies a relatively low charging current to the battery, if the battery temperature is relatively high and the battery temperature increase rate is relatively large. The battery charger 10 supplies a medium level charging current to the battery, if the battery temperature is relatively high and the battery temperature increase rate is relatively small. The battery charger 10 also supplies a medium level charging current to the battery, if the battery temperature is relatively low and the battery temperature increase rate is relatively large. The battery charger 10 supplies a relatively high charging current to the battery, if the battery temperature is relatively low and the battery temperature increase rate is relatively small. In this way, the battery charger 10 of this embodiment adjusts the charging current based upon the temperature of the nickel metal hydride battery and its temperature increase rate. The battery charger 10 starts charging the battery at a temperature of 20° C. as shown by the solid line <b>, The charging current is repeatedly adjusted so that the final battery temperature will be 50° C. or less so as not to affect the battery life. In other words, the battery charger 10 adjusts the charging current to the maximum current that will avoid exceeding the desired final battery temperature, but will shorten charging time.

As stated above, the battery charger 10 frequently changes the charging current in accordance with the battery temperature and battery temperature increase rate. That is, a relatively high current is applied during the initial charging stage, i.e., while the battery temperature is low and the temperature increase rate is small. Relatively low charging current is applied during a final charging stage, i.e., when the battery temperature is high and the temperature increase rate is large in order to minimize temperature rise just before the completion of charging. Specifically, the temperature rise is relatively small (or the temperature rise gradient is relatively small) between time b' (i.e., 11 minutes after the start of charging), which is just before the completion of charging, and time b", at which charging is completed. As a result, temperature rise (overshoot b0) after the completion of charging is small and heat generation during and after charging is suppressed such that temperature rise during and after charging is almost the same (approximately 50.degree. C.) as in the temperature increase using 1C charging, which is indicated by dotted line f.

Even using 1C charging as indicated by dotted line f, if the battery temperature at the start of charging is high, for example, if charging is started at a battery temperature of 30° C., then the battery temperature rises by 30° C. and reaches 60° C. at the completion of charging. In this embodiment, by contrast, current is controlled in accordance with the battery temperature and the battery temperature can be prevented from exceeding 50° C. when charging is completed. In the case of a power tool battery, in particular, where the motor is continuously driven using high current such that the battery capacity is exhausted, the battery charging operation is likely to begin when the battery temperature is already relatively high. In the battery charger of this embodiment, even if a nickel metal hydride battery is at such a high temperature, the battery charger can charge the battery, such that the battery temperature will not exceed an expected battery temperature at the conclusion of charging. It is, thus, possible to repeatedly use the nickel metal hydride battery for a long period of time.

Figure 7:
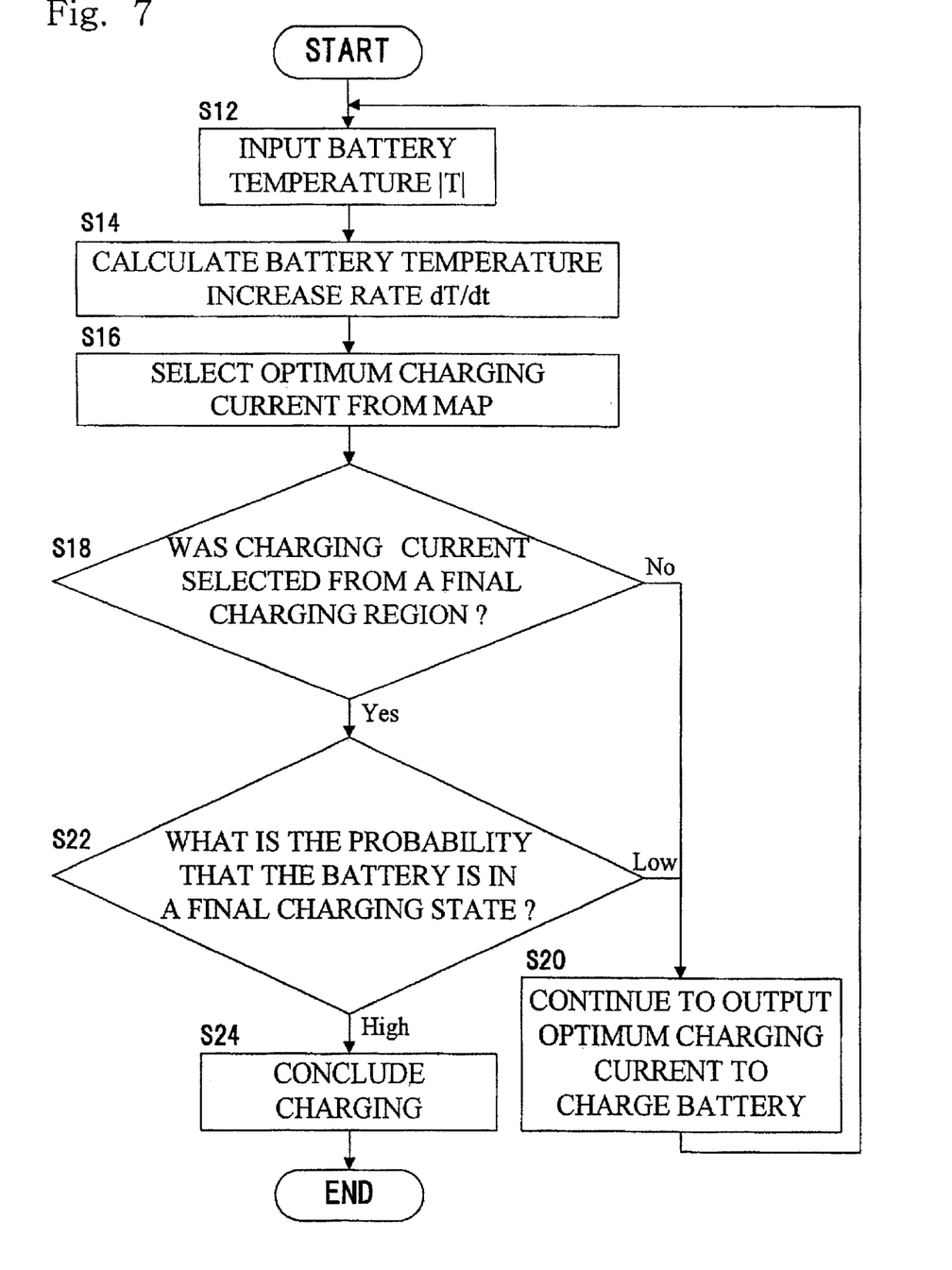
FIG. 7 is a flow chart showing the charging process.

A representative process for using the battery charger 10 of this embodiment will be described with reference to FIGS. 5 and 6, as well as the flow chart shown in FIG. 7.

First, after charging has started, the control section 36 of the battery charger 10 (see FIG. 4) adjusts the charging current and determines whether the battery charging operation has been completed within a predetermined cycle (e.g., at intervals of 100 seconds for the convenience of description, but actually far shorter intervals of 10 seconds or less). Specifically, the absolute temperature T of the nickel metal hydride battery is first inputted (in step S12). Next, the inputted absolute temperature T is differentiated and the battery temperature increase rate $dT/dt$ is calculated (in step S14). Based on the absolute temperature T and the temperature increase rate $dT/dt$, the optimum charging current is selected from the map, which was described above with reference to FIG. 5 (in step S16). In this case, as indicated by cycle <1> in FIG. 6, when the absolute temperature T is between T1 and T2 and the temperature increase rate $dT/dt$ is X1 or less, region I12 is selected and a relatively high current of 4.5C charging current (9A) is supplied, as indicated by the solid line <a> shown in FIG 6.

Thereafter, the control section 36 determines whether the charging current was selected from one of the final charging regions, i.e., hatched regions I31, I32, I33, I34 and I35, which are selected when the battery temperature increase rate is relatively large, and region I25, which is selected when the battery temperature increase rate is at a medium level (in step S18). In this case, since the current was not selected from a final charging region ("NO" in the Step S18), the process returns to step S12 and control of the charging current continues. In cycle <2>, after more than 100 seconds have past, because a relatively high current was supplied in cycle <1> as described above, the battery temperature increase rate dT/dt is larger (X1 to X2) and region 122 is selected. Thus, a medium level current (3.5C) is selected. Since the medium level current is selected in the cycle <2>, the battery temperature increase rate dT/dt will decrease to X1 or less. In cycle <3>, the region 112 is selected and a relatively high charging current is thereby selected once again.

As stated above, if charging is performed by adjusting the current value in accordance with the absolute temperature T and the temperature increase rate dT/dt, the increase rate dT/dt gradually increases. In cycle <6>, as shown in FIGS. 5 and 6, the temperature increase rate dT/dt exceeds X2 and enters region 133. In this case, the determination result is Yes in Step 18. That is, it is determined that the current was selected from one of the final charging regions (i.e., regions 131, 132, 133, 134, 135 and 125) as stated above, and it is then determined the battery is likely to be in a final charging state (in step S22). It is determined that the battery is likely in a final charging state if the charging current has been selected from one of the final charging regions in three consecutive cycles. Because the current was decreased in cycle <6>, the absolute temperature T will fall between T2 and T3 and the temperature increase rate dT/dt decreases to X1 to X2 in the next cycle <7>. As a result, the charging current is selected from region 123. Thus, the determination result as to whether it is highly probable that the battery is in the final charging state is Low in Step S22 and the process proceeds to Step 20, in which charging continues with varying charging currents.

In cycle <13>, the charging current is selected from region 125, which belongs to one of the final charging regions. Then, the charging current is selected from region 135, which also belongs to the final charging regions, in the next cycles <14> and <15>. If the charging current is selected from the final charging regions in three consecutive cycles, the determination result as to whether it is high probable that the battery has entered the final charging state is High and charging is completed (in step S24), thereby ending the charging process.

In the above-described example, a case was described in which the cycle time was 100 seconds for convenience of description. Thus, it was determined that it is highly probable that the battery is in a final charging state if the charging current was selected from one of the final charging regions in three consecutive cycles. If the cycle time is made less than 100 seconds, it is possible to determine that it is highly probable that the battery has entered the final charging state using various methods. For instance, in a cycle of 10 seconds, it is highly probable that the battery is in a final charging state if the charging current is selected from one of the final charging regions in eight out of 10 cycles. Alternatively, it can be determined that the probability is high if the charging current is selected from one of the final charging regions in eight out of 10 cycles and if the charging current is selected from one the final charging regions in five consecutive cycles.

As described above, known battery chargers for charging a nickel-cadmium battery detect that charging is completed by supplying a constant current to the battery and monitoring one or more of temperature, temperature change, voltage and voltage change. In the case of a nickel metal hydride battery, however, patterns of temperature and voltage change vary in accordance with the battery remaining capacity, the battery temperature at the start of battery charging and outside temperature. Therefore, it has been difficult to fully charge a nickel metal hydride battery without fear of overcharge. The battery charger of this embodiment, by contrast, continuously monitors the absolute temperature T and the temperature increase rate dT/dt while adjusting the charging current. It is, therefore, possible to fully charge the battery without fear of overcharge.

The above-described embodiment is an example of charging a nickel metal hydride battery. The battery charger and charging method according to the present invention, however, can be also applied to methods for charging a nickel-cadmium battery. As specified, if the map shown in FIG. 5 is modified in view of the characteristics of a nickel-cadmium battery, the present invention is applicable to methods for charging a nickel-cadmium battery. In addition, if the map is adjusted according to the common characteristics (greatest common divisor) of a nickel-cadmium battery and a nickel metal hydride battery, both the nickel-cadmium battery and the nickel metal hydride battery can be charged. Furthermore, the battery pack 50 may include a discriminating terminal (such as a boss) for distinguishing a nickel metal hydride battery from a nickel-cadmium battery and a map may be prepared for each of the nickel metal hydride battery and the nickel-cadmium battery at the battery charger side. If the battery pack 50 of the nickel metal hydride battery is installed, charging can be controlled according to the map for the nickel metal hydride battery. If the battery pack 50 of the nickel-cadmium is installed, charging can be controlled according to the map for the nickel-cadmium battery.

As stated so far, according to the present invention, the map is retrieved and the battery is charged using the allowable current for which the battery can be charged while preventing excessive increases in battery temperature. This makes it possible to charge a nickel metal hydride battery, the temperature of which tends to rise during charging, within a short period of time without causing deterioration to the battery due to the temperature rise. In addition, just before the completion of charging, the temperature rise of the nickel metal hydride battery will increase significantly. Therefore, the battery is charged using a relatively low current at this time, so that it is possible to suppress "overshoot" after the completion of charging.

The completion of charging is determined, in particular, based on whether or not temperature increase rate is large and whether or not temperature increase rate is still large even if the charging current is reduced. Therefore, it is possible to fully charge the battery without fear of overcharge and without being influenced by the remaining battery storage capacity, the battery temperature and other battery conditions.

What is claimed is:

1. A method for charging a battery, comprising:
   (a) detecting a battery temperature repeatedly at an interval,
   (b) detecting a battery temperature increase rate repeatedly at the interval,
   (c) selecting a charging current from a map containing a plurality of allowable charging current values, wherein the selection is made based upon the detected battery temperature and the detected battery temperature increase rate, and
   (d) supplying the selected charging current to the battery until a next interval, wherein a smaller but not zero charging current value is prescribed for a higher battery temperature, a smaller but not zero charging current value is prescribed for a higher battery temperature increase rate, and a larger charging current value is prescribed for a lower battery temperature and a lower battery temperature increase rate within the map.

2. The method as in claim 1, further comprising:

repeating steps (a) to (d) until the battery is fully charged, wherein the supply of charging current to the battery is terminated upon repeated detection over a series of intervals that a relatively low charging current value has been selected at a relatively high frequency.

3. The method as in claim 2, further comprising terminating the supply of charging current to the battery when a relatively low charging current value is selected in 8 out of 10 intervals and in 5 consecutive intervals.

4. The method as in claim 1, wherein the battery comprises nickel metal hydride battery cells and the method further comprises selecting the charging current in order to prevent the temperature of the nickel metal hydride battery cells from exceeding 50° C.

5. The method as in claim 1, further comprising:

continuing to monitor the battery temperature and the battery temperature increase rate while supplying the selected charging current to the battery and wherein the charging current value is selected in step (c) from the group consisting of:
  (i) a relatively high charging current value, if the battery temperature and battery temperature increase rate are relatively low,
  (ii) an intermediate charging current value, if the battery temperature is relatively low and the battery temperature increase rate is relatively high, or if the battery temperature is relatively high and the battery temperature increase rate is relatively low, and
  (iii) a relatively low but not zero charging current value, if the battery temperature and battery temperature increase rate are relatively high.

6. The method as in claim 5, further comprising:

repeating steps (a) to (d) until the battery is fully charged, wherein the battery charging is terminated upon repeated detection over a series of intervals that the relatively low charging current value has been selected.

7. The method as in claim 6, wherein the supply of charging current to the battery is terminated when a relatively low charging current is selected in 8 out of 10 intervals and in 5 consecutive intervals.

8. The method as in claim 7, wherein the battery comprises nickel metal hydride battery cells and further comprising selecting the charging current values in order to prevent the temperature of the nickel metal hydride battery cells from exceeding 50° C.

9. A battery charger comprising:

a memory storing a map containing a plurality of allowable charging current values, wherein battery temperature and battery temperature increase rate are the only indices for the map, and wherein a smaller but not zero charging current value is prescribed for a higher battery temperature, a smaller but not zero charging current value is prescribed for a higher battery temperature increase rate, and a larger charging current value is prescribed for a lower battery temperature and a lower battery temperature increase rate within the map;

a processor arranged and constructed to execute instructions for:
  (a) determining the battery temperature based upon signals generated by a battery temperature sensor,
  (b) determining the battery temperature increase rate based upon the battery temperature,
  (c) selecting the allowable charging current from the map based upon the battery temperature and the battery temperature increase rate, and a source of charging current coupled to the processor and the battery, and arranged and constructed to supply the charging current to the battery based upon the allowable charging current value selected from the map.

10. The battery charger as in claim 9, the processor further comprises an executer of instruction to terminate the supply of charging current to the battery based upon repeated detection over a series of intervals that a relatively low charging current value has been supplied to the battery.

11. The battery charger as in claim 10, wherein the processor further comprises an executer of instruction to terminate the supply of charging current to the battery when a relatively low charging current is supplied to the battery in 8 out of 10 intervals and in 5 consecutive intervals.

12. A battery charger as in claim 9, the battery comprises nickel metal hydride battery cells and the processor further comprises an executer of instruction for adjusting the supply of charging current in order to prevent the temperature of the nickel metal hydride battery cells from exceeding 50° C.

13. The battery charger as in claim 9, therein the processor further comprises an executer of instructions to:

supply charging current to the battery while monitoring the battery temperature and the battery temperature increase rate; and select the allowable charging current value from the group consisting of:
  (i) a relatively high allowable charging current value, if the battery temperature and battery temperature increase rate are relatively low,
  (ii) an intermediate allowable charging current value, if the battery temperature is relatively low and the battery temperature increase rate is relatively high, or if the battery temperature is relatively high and the battery temperature increase rate is relatively low, and
  (iii) a relatively low but not zero allowable charging current value, if the battery temperature and battery temperature increase rate are relatively high.

14. The battery charger as in claim 13, wherein the processor further comprises an executer of instruction to terminate the supply of charging current to the battery based upon repeated detection over a series of intervals that relatively low charging current has been supplied to the battery.

15. The battery charger as in claim 14, wherein the processor further comprises an executer of instruction to terminate the supply of charging current when a relatively low charging current is supplied to the battery in 8 out of 10 intervals and in 5 consecutive intervals.

16. A battery charger as in claim 15, wherein the battery comprises nickel metal hydride battery cells and the processor further comprises an executer of instruction for adjusting the supply of charging current in order to prevent the temperature of the nickel metal hydride battery cells from exceeding 50° C.

17. A method for charging a battery comprising:

monitoring battery temperature and battery temperature increase rate of the battery, and adjusting charging current supplied to the battery based only on the battery temperature and the battery temperature increase rate, wherein the charging current is selected from the group consisting of:
(i) a relatively high current, if the battery temperature and battery temperature increase rate are relatively low,
(ii) an intermediate current, if the battery temperature is relatively low and the battery temperature increase rate is relatively high, or if the battery temperature is relatively high and the battery temperature increase rate is relatively low, and
(iii) a relatively low but not zero current, if the battery temperature and battery temperature increase rate are relatively high.

18. The method as in claim 17, wherein the battery comprises nickel metal hydride battery cells and the supply of charging current is adjusted so as to prevent the temperature of the nickel metal hydride battery cells from exceeding 50° C.

19. The method as in claim 18, wherein the charging current is terminated when a relatively low charging current is supplied to the battery in 8 out of 10 intervals and in 5 consecutive intervals.

20. An apparatus comprising:
means for monitoring battery temperature and battery temperature increase rate of a rechargeable battery, and
means for adjusting charging current supplied to the battery based only on the battery temperature and the battery temperature increase rate, wherein the charging current is selected from the group consisting of:
(i) a relatively high current, if the battery temperature and battery temperature increase rate are relatively low,
(ii) an intermediate current, if the battery temperature is relatively low and the battery temperature increase rate is relatively high, or if the battery temperature is relatively high and the battery temperature increase rate is relatively low, and
(iii) a relatively low but not zero current, if the battery temperature and battery temperature increase rate are relatively high.

21. The apparatus as in claim 20, wherein the rechargeable battery comprises nickel metal hydride battery cells and the charging current adjusting means prevents the temperature of the nickel metal hydride battery cells from exceeding 50° C.

22. The apparatus as in claim 21, further comprising means for terminating the supply of charging current when relatively low charging current is supplied to the rechargeable battery in 8 out of 10 intervals and in 5 consecutive intervals.

* * * * *